United States Patent Office 3,125,557
Patented Mar. 17, 1964

3,125,557
SUSPENSION POLYMERIZATION OF VINYL CHLORIDE USING AMINO POLYACETIC ACID COMPOUNDS
Alva F. Harris, Wilbraham, Mass., assignor to Monsanto Chemical Company, St. Louis, Mo., a corporation of Delaware
No Drawing. Filed Dec. 19, 1960, Ser. No. 76,524
5 Claims. (Cl. 260—92.8)

This invention relates to the suspension polymerization of vinyl chloride. More particularly, the invention relates to a method of improving the color of polyvinyl chloride prepared by suspension polymerization.

The minimization of discoloration of the polymer is a recognized problem in the suspension polymerization of vinyl chloride with water-soluble suspending agents. Although various known techniques present a partial solution to the problem, it is frequently found that the degree of discoloration of bead polyvinyl chloride varies unpredictably (e.g., with variations in the source of raw materials for the polymerization recipe) with the result that the polymer may be unduly discolored, particularly after processing, despite the use of known techniques designed to minimize discoloration.

One object of this invention is to provide a novel process for the suspension polymerization of vinyl chloride.

Another object is to provide a method of improving the color of polyvinyl chloride prepared by suspension polymerization in the presence of water-soluble suspending agents.

These and other objects are attained by conducting the suspension polymerization of vinyl chloride with a water-soluble suspending agent in the presence of 0.05–300 parts per million, based on the weight of vinyl chloride, of an amino polyacetic acid or derivative thereof.

The following examples are given to illustrate the invention. In the preparation of any two polymers designed for comparison of optical properties in these examples, care is taken to use the same source of raw materials, the same type of reaction vessel, etc., to avoid confusion of the results by unknown variables. Quantities mentioned in the examples, unless otherwise specified, are quantities by weight.

EXAMPLE I

Part A

Polyvinyl chloride beads are prepared from the following polymerization recipe:

| Component: | Parts |
|---|---|
| Water | 150 |
| Vinyl chloride | 100 |
| Lauroyl peroxide | 0.2 |
| Suspending agent [1] | 0.3 |

[1] A copolymer of about 50 mol percent vinyl acetate and 50 mol percent maleic anhydride in which about 4% of the maleic anhydride units have been esterified with 2-ethylhexanol.

The water, catalyst, and suspending agent are charged to a suitable reaction vessel, which is then vacuum purged. The vinyl chloride is added, and the reaction mixture is heated with agitation in an inert atmosphere for 16 hours at 50° C.

The product of the reaction is filtered to dewater the polyvinyl chloride beads, which are then washed, dried, and formed into specimens for testing optical properties.

All specimens for testing optical properties in these examples are prepared by fusion blending the polyvinyl chloride beads with a plasticizer, stabilizer, and lubricant, adding a minor amount of titanium dioxide pigment, milling the pigment-containing blend for 7 minutes on a two-roll mill having the front roll temperature set at 156° C. and the back roll temperature set at 150° C., and cutting the milled blend into pieces of comparable size and shape. There are no variations in the preparation of the test specimens or in the testing of the specimens other than the use of different bead polyvinyl chlorides. Specimen I, when hereinafter mentioned, refers to the specimen prepared as outlined above. Specimen II is the same specimen after being heated for 20 minutes at 176–178° C.

The percent reflectance of light exhibited by each of the test specimens of this example is shown in Table I.

Part B

Part A is repeated with the exception that 100 parts per million, based on vinyl chloride, of the pentasodium salt of diethylenetriamine pentaacetic acid are included in the initial charge to the reaction vessel. The percent reflectance of light exhibited by each of the test specimens of polyvinyl chloride is shown in Table I.

TABLE I

| | Percent Reflectance | |
|---|---|---|
| | Specimen I | Specimen II |
| Part A | 35.4 | 29.0 |
| Part B | 58.1 | 41.4 |

As indicated in the above table by the higher percent reflectance values of the specimens of Part B, polymerization in the presence of the amino polyacetic acid compound has resulted in decreasing the yellowness of the polymer.

EXAMPLE II

Part A

Polyvinyl chloride beads are prepared from the following polymerization recipe:

| Component: | Parts |
|---|---|
| Water | 150 |
| Vinyl chloride | 100 |
| Lauroyl peroxide | 0.2 |
| Suspending agent [1] | 0.7 |

[1] An acrylic acid-2-ethylhexyl acrylate copolymer containing 95 mol percent of combined acrylic acid and having a specific viscosity of 3.5, measured as a 1% aqueous solution of the copolymer at 25° C.

The procedure is the same as the procedure described in Part A of Example I. The percent reflectance of light exhibited by each of the test specimens of this example is shown in Table II.

Part B

Part A is repeated with the exception that 200 parts per million, based on vinyl chloride, of the disodium salt of ethylenediamine tetraacetic acid are included in the initial charge to the reaction vessel. The percent reflectance of light exhibited by each of the test specimens of polyvinyl chloride is shown in Table II.

TABLE II

| | Percent Reflectance | |
|---|---|---|
| | Specimen I | Specimen II |
| Part A | 34.3 | 26.8 |
| Part B | 50.1 | 33.9 |

The invention is a method of preparing bead polyvinyl chloride by conducting the suspension polymerization of vinyl chloride with a water-soluble suspending agent in the presence of 0.05–300 parts per million, based on the weight of vinyl chloride, of an amino polyacetic acid or derivative thereof.

Amino polyacetic acids (i.e., compounds containing at least two —CH$_2$COOH groups bound to a nitrogen atom) utilizable in the practice of the invention include, e.g., aminodiacetic acid, aminotriacetic acid, alkylenepolyamine polyacetic acids such as ethylene diamine diacetic acid, ethylenediamine triacetic acid, (hydroxyethyl)ethylenediamine triacetic acid, ethylene diamine tetraacetic acid, propylenediamine tetraacetic acid, butylenediamine diacetic acid, diethylenetriamine pentaacetic acid, etc., and mixtures thereof.

Amino polyacetic acid derivatives utilizable in the practice of the invention are the alkali metal salts, alkylamine salts, dialkylamine salts, and alkyl esters of the acids. Exemplary of such derivatives are the mono-, di-, tri-, and tetrasodium salts of ethylenediamine tetraacetic acid, the corresponding potassium and lithium salts, the n-butylamine and diethylamine salts of ethylenediamine tetraacetic acid, the n-butyl ester of ethylenediamine tetraacetic acid, etc.

The amino polyacetic acid or derivative thereof is employed in amounts in the range of 0.05–300 parts per million, based on the weight of vinyl chloride. Ordinarily, about 0.1–10 parts per million are sufficient to accomplish an improvement in the color of the polymer, and the use of amounts in excess of this range does not seem to improve the color further. However, in some cases, larger amounts of amino polyacetic acid compound are required to effect any improvement in the color of the polymer, and, in other cases, it is difficult to predict exactly how much amino polyacetic acid compound should be used because of the fact that undue discoloration of the polymer can result unexpectedly from an apparently minor variation in the polymerization process (e.g., a change in the source of a raw material). It is, therefore, frequently desirable to use amounts of amino polyacetic acid compound in the range of 10–300 parts per million, based on the weight of vinyl chloride, if only as a precautionary measure.

With the exception of the novel feature of conducting the polymerization in the presence of an amino polyacetic acid compound, the process of the invention is a conventional suspension polymerization process. Thus, vinyl chloride is polymerized with agitation in an inert atmosphere in the presence of catalytic amounts of a free radical-generating polymerization initiator such as a peroxy or azo compound, e.g., benzoyl peroxide, lauroyl peroxide, di-t-butyl peroxide, dicumyl peroxide, t-butyl peracetate, azoisobutyronitrile, etc., at temperatures usually in the range of 45–75° C., preferably 50–70° C., under atmospheric or superatmospheric pressure. The amount of water employed is such that the water/monomer ratio is in the range of 1:1 to 9:1, usually about 1.5:1.

The suspending agent can be any of the water-soluble organic materials conventionally employed as suspending agents in bead polymerization processes, e.g., polyvinyl alcohol, olefin-maleic anhydride copolymers, vinyl ester-maleic anhydride copolymers, sulfonated polystyrenes, acrylic acid polymers and copolymers, cellulose ethers, etc. It is usually employed in amounts of 0.005–2%, preferably 0.01–0.5%, based on the weight of water in the reaction mixture. It can be included in the initial polymerization recipe or, alternatively, can be added to the reaction mixture during polymerization, e.g., at 20–30% conversion of monomer to polymer.

Although the invention has been described with particular emphasis on the homopolymerization of vinyl chloride, it is also applicable to the copolymerization of vinyl chloride with up to an equal amount by weight of one or more copolymerizable monomers, e.g., diethyl maleate, other dialkyl maleates, dialkyl fumarates, ethylene, vinyl acetate, vinylidene chloride, acrylonitrile, methyl acrylate, other alkyl acrylates, etc.

If desired, the polymerization can be conducted in the presence of additives such as preformed polymers, e.g., natural and synthetic rubbers, antioxidants, stabilizers, fillers, colorants, etc.

The invention is particularly advantageous in that conducting the suspension polymerization of vinyl chloride in the presence of amino polyacetic acid compounds can effect an improvement in the color of bead polyvinyl chloride or can serve as a precautionary measure to prevent unexpected discoloration of the polymer in processes which normally lead to the formation of bead polyvinyl chloride having good color.

It is obvious that many variations can be made in the products and processes set forth above without departing from the spirit and scope of the invention.

What is claimed is:

1. In a process for polymerizing vinyl chloride with agitation in suspension in an aqueous medium containing a water-soluble suspending agent and a free radical-generating polymerization initiator at temperatures between 45–75° C., the improvement which comprises conducting the polymerization in the presence of 0.05–300 parts per million, based on the weight of vinyl chloride, of an amino polyacetic acid compound of the group consisting of compounds containing at least two —CH$_2$COOH groups bound to a nitrogen atom and the alkali metal salts, alkylamine salts wherein the alkyl radical contains 1 to 4 carbon atoms, dialkylamine salts wherein the alkyl radicals contain 1 to 2 carbon atoms, and alkyl esters wherein the alkyl radical contains 1 to 4 carbon atoms, of compounds containing at least two —CH$_2$COOH groups bound to a nitrogen atom.

2. A process as in claim 1 wherein the amino polyacetic acid compound is an alkylenepolyamine polyacetic acid.

3. A process as in claim 1 wherein the amino polyacetic acid compound is an alkali metal salt of an alkylenepolyamine polyacetic acid.

4. A process as in claim 3 wherein the amino polyacetic acid compound is the disodium salt of ethylenediamine tetraacetic acid.

5. A process as in claim 3 wherein the amino polyacetic acid compound is the pentasodium salt of diethylenetriamine pentaacetic acid.

References Cited in the file of this patent

UNITED STATES PATENTS

| | | |
|---|---|---|
| 2,558,728 | Britton | July 3, 1951 |
| 2,772,256 | Manganelli | Nov. 27, 1956 |
| 2,979,491 | Piloni | Apr. 11, 1961 |